(12) United States Patent
Barnes et al.

(10) Patent No.: US 8,972,194 B2
(45) Date of Patent: Mar. 3, 2015

(54) METHOD AND SYSTEM FOR PULSE NEUTRON CAPTURE SIGMA INVERSION

(75) Inventors: David Barnes, Sausalito, CA (US); Ahmed Badruzzaman, San Ramon, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 1094 days.

(21) Appl. No.: 12/941,227

(22) Filed: Nov. 8, 2010

(65) Prior Publication Data

US 2012/0116732 A1   May 10, 2012

(51) Int. Cl.
    *G01V 5/10*  (2006.01)
(52) U.S. Cl.
    CPC .............. *G01V 5/107* (2013.01); *G01V 5/104* (2013.01)
    USPC .............................................................. 702/8
(58) Field of Classification Search
    CPC ............................................................ G01V 5/107
    USPC .............................................................. 702/8
    See application file for complete search history.

(56) References Cited

U.S. PATENT DOCUMENTS

| | | | |
|---|---|---|---|
| 4,409,481 A | | 10/1983 | Smith, Jr. et al. |
| 4,600,838 A | * | 7/1986 | Steinman et al. .......... 250/269.8 |
| 5,128,541 A | | 7/1992 | Mahdavi et al. |
| 5,369,578 A | | 11/1994 | Roscoe et al. |
| 5,532,481 A | * | 7/1996 | Mickael .................... 250/269.4 |
| 7,205,535 B2 | | 4/2007 | Madigan et al. |
| 7,365,308 B2 | | 4/2008 | Trcka et al. |
| 7,408,150 B1 | | 8/2008 | Flaum et al. |
| 2000/5369578 | | 11/1994 | Roscoe et al. |
| 2004/0010373 A1 | | 1/2004 | Smits et al. |
| 2005/0030059 A1 | | 2/2005 | Tabarovsky et al. |

OTHER PUBLICATIONS

Burgess et al., "Simplex Optimization by Advance Prediction for Single-Element INstrument Neutron Activation Analysis", 1984, Anal. Chem. vol. 56 pp. 1440-1443.*
Raoux et al., "Improvement of the matrix effect compensation in active neutron measurement by simulated annealing algorithm" Jun. 2009, IEEE, 2009 First International Conference on Advancements in Nuclear Instrumentation Measurement Methods and their Applications (ANIMMA); http://ieeexplore.ieee.org/xpls/abs_all.jsp?arnumber=5503786.*
Neuman, Charles H. "Programs to Process and Display Row Data from Pulsed Neutron Capture Logs." SPWLA 34$^{th}$ Annual Logging Symposium, Jun. 13-16, 1993 pp. 1-23.
Wright, M.H., "Direct Search Methods: Once Scorned, Now Respectable." Numerical Analysis, 1995 pp. 191-208.
Hall, J. E., et al., "A New Thermal Neutron Decay Logging System—TDT-M" Journal of Petroleum Technology, Jan. 1982, pp. 199-207.
Kreyszig, Erwin (1999). "Numerical Methods in General," Advanced Engineering Mathematics. New York: John Wiley & Sons, pp. 841-847.
Extended European Search Report, issued on Jul. 2, 2014 during the prosecution of European Patent Application No. 11840207.2.
International Search Report, issued on May 1, 2012 during the prosecution of International Application No. PCT/US2011/051794.
Written Opinion of the International Searching Authority, issued on May 1, 2012 during the prosecution of International Application No. PCT/US2011/051794.

* cited by examiner

*Primary Examiner* — Jonathan C Teixeira Moffat
*Assistant Examiner* — Regis Betsch
(74) *Attorney, Agent, or Firm* — Albert K. Shung

(57) ABSTRACT

In some aspects of the invention, a computer-implemented method of obtaining sigma values from pulsed neutron capture decay curve is disclosed. The method can include selecting spectra collected by pulsed neutron instrument disposed down a borehole traversing a rock formation, the spectra including capture interactions and inelastic interactions; and modeling the selected spectra using a nonlinear model to obtain sigma values relating to one or more reservoir properties.

23 Claims, 16 Drawing Sheets

METHOD AND SYSTEM FOR PULSE NEUTRON CAPTURE SIGMA INVERSION

FIELD

The present invention relates generally well logging and more particularly to characterizing subsurface formations around a borehole by analysis of pulsed neutron capture data.

BACKGROUND

Pulsed neutron capture inversions are nonlinear problems with many local minima around the absolute minimum. A Neuman pulsed neutron decay (PNC) method has been used in the past to invert PNC decay curves. This method involves fitting these decay curves produced by the tools to dual exponential response model. From the fitted parameters the sigma of both the borehole and formation can be determined. The Sigma can then be used to determine petrophysical properties such as steam saturation, water saturation or a pseudo-porosity. However, fitting these curves is not a trivial matter since the data can have poor signal to noise ratios, especially during later times (after 500 μs). It is during this time that the formation signal tends to dominate the borehole signal.

In addition to computing the Sigma values, the Neuman method also calculates PNC-based density and porosity indicators. Both of these inversions use the sigma information to produce the estimates. The Neuman code is also used to plot the PNC data and the resultant fitted curve. This allows users to visually inspect the fit. Because of the low signal to noise ratio fitting routines can often "lock on" to bad fits. Visually inspecting the curve allows users to determine if a sigma value is a statistical outlier or just a bad fit.

The Neuman method uses a Newton-Raphson method to optimize the fit the measured data to the inversion model. This method works well for problems that have a signal minimum but can run into trouble when dealing with noisy data. The method can converge to solution that are one of many local minima but is not the absolute minimum that would characterize the "best" fit. The results are that the plotted log results from this processing may contain large spikes or outliers that come from a failure to converge on the absolute minimum.

Given the problems above, what is needed is an improved method and system for inverting pulsed neutron capture decay curves.

SUMMARY

In accordance with some aspects of the present disclosure, a computer-implemented method of obtaining Sigma values from pulsed neutron capture decay curve is disclosed. The method includes selecting spectra collected by pulsed neutron instrument disposed down a borehole traversing a rock formation, the spectra including capture interactions and inelastic interactions; and modeling, by a processor in communication a computer-readable medium including instructions that when executed cause the processor to select the spectra using a nonlinear model to obtain Sigma values relating to one or more reservoir properties.

In some aspects, the nonlinear model can include a simplex model, for example a Nelder-Mead simplex model. One type of Nelder-Mead simplex model that can be used is a multiple vertex simple, for example a five (5) vertex simplex. In some aspects, the nonlinear model can include a simulated annealing model.

In some aspects, the Sigma values can be obtained using a multi-exponential nonlinear model related to the borehole and the rock formation. The multi-exponential model can be based on parameters that include an amplitude associated with the borehole, an amplitude associated with the rock formation surrounding the borehole, a rate of neutron decay associated with the borehole, and a rate of neutron decay associated with the rock formation. The nonlinear model can be based on initial estimates related to an amplitude associated with the borehole, an amplitude associated with the rock formation surrounding the borehole, a rate of neutron decay associated with the borehole, and a rate of neutron decay associated with the rock formation.

In some aspects, the reservoir properties can include petrophysical properties including porosity, saturation and/or gas/water-gas/oil contacts. The reservoir properties can also include properties related to commercial exploitation of the rock formation, wherein the properties related to commercial exploitation include a pay zone. The Sigma values can be obtained based on a rate of neutron decay in the borehole and the rock formation. The initial estimates can be determined according to parameters $C_1$ to $C_4$ and $t_1$ to $t_4$ are neutron decay counts and neutron decay times, respectively, that corresponds to four points chosen on a neutron decay curve from data from the selected spectra, $A_{bh}$ is an amplitude associated with the borehole, $A_{fm}$ is an amplitude associated with the rock formation surrounding the borehole, $\tau_{bh}$, is a rate of neutron decay associated with the borehole, and $\tau_{fm}$ is a rate of neutron decay associated with the rock formation.

In accordance with some aspects of the present disclosure, a computer-implemented system for obtaining Sigma values from pulsed neutron capture decay curve is disclosed. The system can include a processor in communication with a memory having instructions stored therein which, when executed are arranged to: select spectra collected by pulsed neutron instrument disposed down a borehole traversing a rock formation, the spectra including capture interactions and inelastic interactions; and model the selected spectra using a nonlinear model to obtain Sigma values relating to one or more reservoir properties.

In accordance with some aspects of the present disclosure, a system for obtaining Sigma values from pulsed neutron capture decay curve is disclosed. The system can include a pulsed neutron instrument, positionable in a borehole traversing a rock formation, arranged to generate neutrons into the borehole and the rock formation; a detector, positionable in the borehole, arranged to detect spectra of decaying neutrons, wherein the spectra including capture interactions and inelastic interactions; and a processor, in communication with a memory having instructions stored therein which, when executed are arranged to model the spectra using a nonlinear model to obtain Sigma values relating one or more reservoir properties. In some aspects, the processor can be configured to construct a decay curved and determine an estimate for a decay rate based on the detected spectra.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
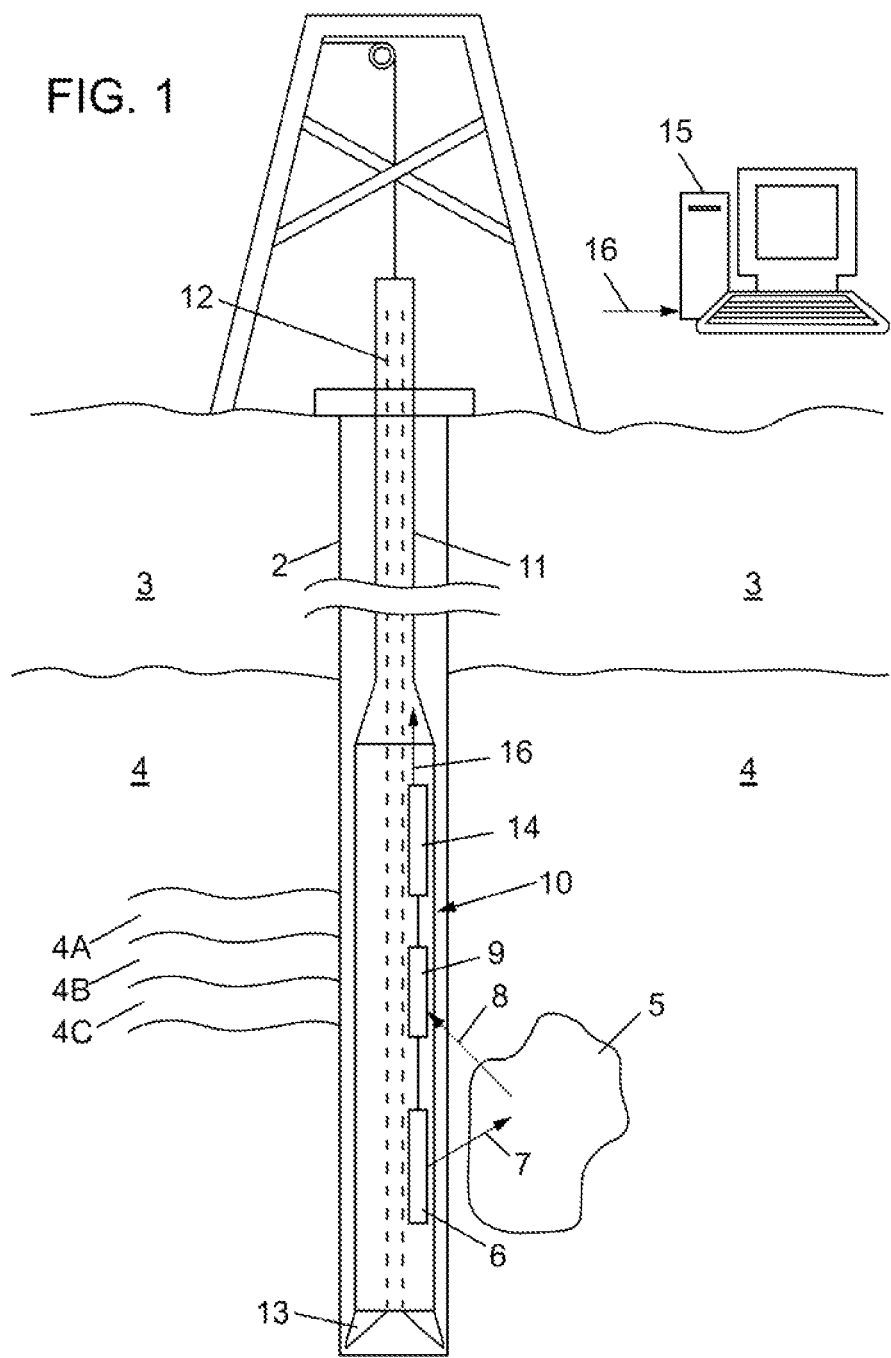
FIG. 1 shows an exemplary embodiment of a logging tool disposed in a borehole penetrating the earth in accordance with some aspects of the present disclosure.

FIG. 1 shows an exemplary embodiment of a logging tool 10 disposed in a borehole 2 penetrating the earth 3. The earth 3 includes an earth formation 4, which may include layers 4A-4C. In the embodiment of FIG. 1, the logging tool 10 is configured for logging-while-drilling (LWD) or measurement-while-drilling (MWD) applications. As such, the logging tool 10 is disposed in a collar at the distal end of drill string 11. Logging may be performed during drilling or during a temporary halt. In other embodiments, the logging tool 10 may be configured to be conveyed through the borehole 2 by a wireline, a slickline, or coiled tubing.

Referring to FIG. 1, during drilling operations, drilling mud is pumped from the surface of the earth 3 through a mud channel 12 in the drill string 11 to a cutting device 13 for lubrication and cooling. The drilling mud is discharged from the distal end of the drill string 11 into the borehole 2. In general, the drilling mud and borehole fluid have properties that cause the drilling mud or the borehole fluid to reflect neutrons. Accordingly, the logging tool 10 includes a configuration of a neutron reflector and a neutron absorber to minimize the effects of neutrons reflected by the drilling mud or the borehole fluid.

In the embodiment of FIG. 1, the logging tool 10 is configured to estimate the porosity of the formation 4. The porosity is measured by directing incident neutrons 7 to a region of investigation 5 in the formation 4. A neutron source 6 emits the incident neutrons 7. Depending on the properties of the formation 4, such as the porosity and the type of formation fluid disposed in the pores of the formation 4, a certain percentage of the incident neutrons 7 will be reflected back to the logging tool 10. The logging tool 10 includes a neutron detector 9 to detect and measure an amount of neutrons reflected by the formation 4 (i.e., reflected neutrons 8). The configuration of the neutron reflector and the neutron absorber at the logging tool 10 is optimized to increase the probability of detecting the reflected neutrons 8 and to minimize the effects on the detector 9 resulting from neutrons reflected by non-formation materials such as the drilling fluid and the borehole fluid.

The neutron source 6 can be a chemical source of neutrons or a pulsed neutron source. In general, the incident neutrons 7 are fast neutrons with energy greater than 0.1 MeV.

Referring to FIG. 1, the logging tool 10 includes an electronic unit 14 that is coupled to the detector 9. The electronic unit 14 is configured to receive measurements performed by the neutron detector 9. Data 16 associated with the measurements can be recorded by the electronic unit 14 and/or transmitted to a processing system 15 disposed at the surface of the earth 3. When the data 16 is recorded, the data 16 can be stored for later retrieval when the logging tool 10 is removed from the borehole 2. A telemetry system can be used for transmitting the data 16 to the processing system 15. Non-limiting examples of techniques the telemetry system uses to transmit the data 16 include pulsed-mud, wired drill pipe, acoustic, optical, and electromagnetic.

The processing system 15 receives and processes the data 16 to estimate a property of the formation 4. Non-limiting examples of the property include porosity and a location of a boundary between formation layers 4A-4C. In general, the property is presented to a drilling operator or petroanalyst to optimize drilling or formation analysis.

Pulsed Neutron Capture (PNC) data is taken as a pulse of 14 MeV neutrons slow down and then decay in a subsurface formation. The rate of decay of the signal with time is inversely proportional to the formation sigma. Sigma is a physical property of the rocks and fluids in the formation, like bulk density or porosity. Sigma is utilized to compute water saturation in high salinity reservoirs and the steam saturation in steam floods and is the macroscopic cross section for the absorption of thermal neutrons, or capture cross section, of a volume of matter, measured in capture units (c.u.). Sigma is the principal output of the pulsed neutron capture log, which is mainly used to determine water saturation behind casing. Thermal neutrons have about the same energy as that of the surrounding matter, typically less than 0.4 eV.

Pulsed neutron capture (PNC) measurements are used primarily to obtain petrophysical properties behind casing. PNC tools function by emitting a pulse of 14 MeV neutrons into the borehole and surrounding formation. As the neutrons spread out, detectors, such as two scintillation detectors made from sodium iodide (NaI) crystals, located above the source measure the gamma rays produced by neutron interactions with the media. These gamma rays counts are recorded as a function of time. The decay of the gamma ray signal detected in the tool is equivalent to the decay of the neutron flux (or population) in the borehole and formation. The neutron flux decays exponentially as a function of time. The rate of decay of the neutron flux is inversely proportional to the sigma of either the borehole or formation. Thus, obtaining a bulk sigma for the formation can yield reservoir properties such as petrophysical information such as saturation, or the relative amount of water, oil and gas in the pores of a rock, usually as a percentage of volume, and porosity, as well as production-type information such as pay-zones.

Since PNC tools are not shielded from the borehole, the signal seen in the detector is the sum of the borehole and formation signals. To deconvolve this signal, a multiple exponential model can be used. In some aspects, the multiple exponential model can be a dual exponential model with one exponential accounting for the borehole and the other for the formation.

Neutron capture is a neutron interaction in which the neutron is absorbed by the target nucleus, producing an isotope in an excited state. The activated isotope de-excites instantly through the emission of characteristic gamma rays. Neutron capture, also called thermal capture, usually occurs at low thermal energies at which the neutrons have about the same energy as the surrounding matter, typically below 0.4 eV (0.025 eV at room temperature).

Pulsed neutron spectroscopy log is a wireline log of the yields of different elements in the formation, measured using induced gamma ray spectroscopy with a pulsed neutron generator. The elemental yields are derived from two intermediate results: the inelastic and the capture spectrum. The inelastic spectrum is the basis for the carbon-oxygen log, and can also give information on other elements. The capture spectrum depends on many elements, mainly hydrogen, silicon, calcium, iron, sulfur and chlorine. Since the elemental yields give information only on the relative concentration of elements, they are normally given as ratios, such as C/O, Cl/H, Si/(Si+Ca), H/(Si+Ca) and Fe/(Si+Ca). These ratios are indicators of oil, salinity, lithology, porosity and clay, respectively. The depth of investigation of the log is typically several inches into the formation and can be run in open or cased hole.

In general, obtaining sigma values from pulsed neutron capture decay can be thought of as an optimization problem. Given an observed decay curve, what set of parameters produce an optimal fit to a multiple exponential model. In some aspects, the multiple exponential model is a dual exponential model of the form:

$$C(t) = A_{bh}e^{-\frac{t}{\tau_{bh}}} + A_{fm}e^{-\frac{t}{\tau_{fm}}} \tag{1}$$

where $A_{bh}$ is an amplitude associated with the borehole, $A_{fm}$ is an amplitude associated with the rock formation surrounding the borehole, $\tau_{bh}$ is a rate of neutron decay associated with the borehole, and $\tau_{fm}$ is a rate of neutron decay associated with the rock formation.

The decay rates can be related to the borehole and formation sigma values by the following relation:

$$\tau = \frac{1}{v\Sigma} = \frac{4545}{\Sigma} \tag{2}$$

with $v$ being the thermal neutron velocity.

Restating equation (2) another way, sigma can be calculated as follows:

$$\Sigma_{formation} = \frac{1}{v\tau_{fm}} = \frac{4545}{\tau_{fm}} \tag{3}$$

where the term $\tau_{fm}$ is determined as a result of fitting the curve.

The dual exponential function is fit to the data using a least squares minimization technique. This is laid out in the following way:

$$\chi^2[\{A_{bh}, \tau_{bh}, A_{fm}, \tau_{fm}\}] = \sum_{i=1}^{n} \frac{\left[C(t_i) - \left(A_{bh}e^{-\frac{t}{\tau_{bh}}} + A_{fm}e^{-\frac{t}{\tau_{fm}}}\right)\right]^2}{C(t_i)} \tag{4}$$

which is solved for the optimal values of decay rates and amplitudes which minimize $\chi^2$. This definition will be used to determine the "best" fit, not whether or not the sigma appears correct, but whether or not it minimizes $\chi^2$.

The general approach to finding the optimal values of $A_{bh}$, $\tau_{bh}$, $A_{fm}$ and $\tau_{fm}$ is to restate the problem as a weighted least squares optimization. The problem is to find a set of $\{A_{bh}, \tau_{bh}, A_{fm}, \tau_{fm}\}$ that minimizes $\chi^2$, where $\chi^2$ is of the form:

$$\chi^2 = \sum_i \frac{(C(t_i) - y_i)^2}{y_i} \tag{5}$$

The density and porosity estimates based on PNC data are based on the inelastic and capture count ratios, respectively. The inelastic count ratio is given by the following:

$$INELRAT = \ln \frac{N - \left(A_{fm,N}\frac{T_B - \tau_{fm,N}\left(1 - \exp\left(\frac{-T_B}{\tau_{fm,N}}\right)\right)}{1 - \exp\left(\frac{-T_B}{\tau_{fm,N}}\right)} + A_{bh,N}\frac{T_B - \tau_{bh,N}\left(1 - \exp\left(\frac{-T_B}{\tau_{bh,N}}\right)\right)}{1 - \exp\left(\frac{-T_B}{\tau_{bh,N}}\right)}\right)}{F - \left(A_{fm,F}\frac{T_B - \tau_{fm,F}\left(1 - \exp\left(\frac{-T_B}{\tau_{fm,F}}\right)\right)}{1 - \exp\left(\frac{-T_B}{\tau_{fm,F}}\right)} + A_{bh,F}\frac{T_B - \tau_{bh,F}\left(1 - \exp\left(\frac{-T_B}{\tau_{bh,F}}\right)\right)}{1 - \exp\left(\frac{-T_B}{\tau_{bh,F}}\right)}\right)} \tag{6}$$

where N and F are the total number of near and far counts, respectively, during the pulse, $T_B$ is the length of time the source is on, and A and τ are the amplitude and rate of decay of the fitted curve. The subscripts N and F refer to near and far detectors, and bh and fm refer to borehole and formation, respectively.

The formula for the capture ratio is given by:

$$CAPRAT = \frac{A_{fm,N}\tau_{fm,N} + A_{bh,N}\tau_{bh,N}}{A_{fm,F}\tau_{fm,F} + A_{bh,F}\tau_{bh,F}} \quad (7)$$

In some aspect, a simplex method can be used to optimize the dual exponential model to the measured pulsed neutron capture decay curves using the form of equation (1). One type of simplex that can be used is the Nelder-Mead simplex method. The Nelder-Mead simplex method begins with a 5 vertex simplex derived from the initial estimates of the fit parameters $\{A_{bh}, \tau_{bh}, A_{fm}, \tau_{fm}\}$. The vertices are then ranked from best to worst based on the $\chi^2$ of each vertex. Then the worst point is moved in the direction of the better points in a series of reflection, expansions and contractions. Eventually the simplex will contract to a single point and that is the optimal solution.

The Nelder-Mead simplex method is a heuristic method that relies on sampling points in a logical pattern to move toward a minimum. The simplex method requires a guess in the general ballpark of the answer but the guess does not necessarily need to be located in the actual "trough" the absolute minimum is located.

For an optimization problem with n variables (in this case n=4) an n+1 "simplex" can be formed in the solution space. Each vertex of the simplex is a potential solution. The general approach is to compute $\chi^2$ for each vertex and rank each vertex from best to worst, with lower $\chi^2$ being better and higher $\chi^2$ being worse. Then through a series of steps the simplex is reflected, compressed, or expanded in an attempt to move closer to "good" vertices and further from "bad" ones.

Figure 2:
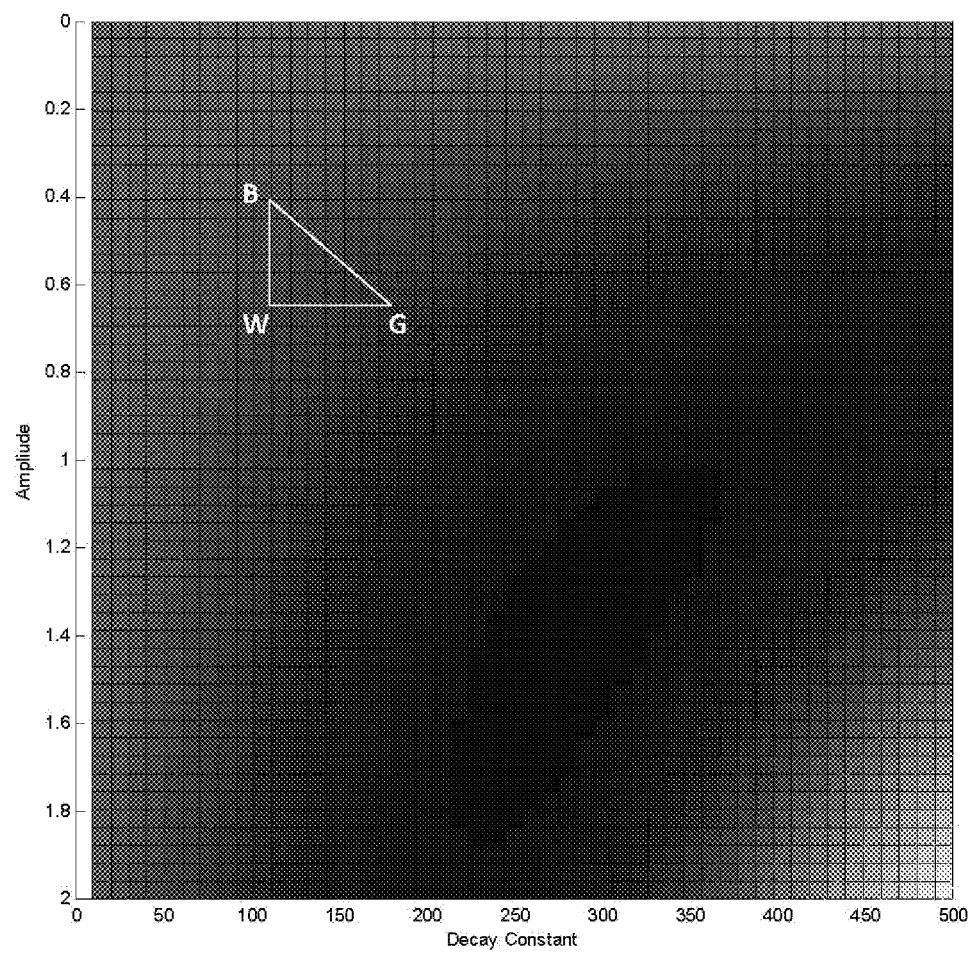
FIG. 2 a starting simplex for a two dimensional Nelder-Mead simplex in accordance with some aspects of the present disclosure.

In order to visually represent the steps in a Nelder-Mead simplex method, this discussion will be limited to two dimensions. The simplex in this case is a triangle. One vertex of the triangle is the initial estimate of the solution. The other two vertices are determined by moving 5% along each dimension. FIG. 2 shows the initial simplex where black in the figure represents lower $\chi^2$ and white represents higher $\chi^2$. The 3 vertices are ranked according to their $\chi^2$, best (B), good (G) and worst (W). For greater than 2 dimensions, there would be multiple "good" points (e.g. G1, G2, G3 . . . etc). The logic behind the simplex method is that if vertices B and G are better solutions than W, the solution space in the direction of B and G should be explored.

Figure 3:
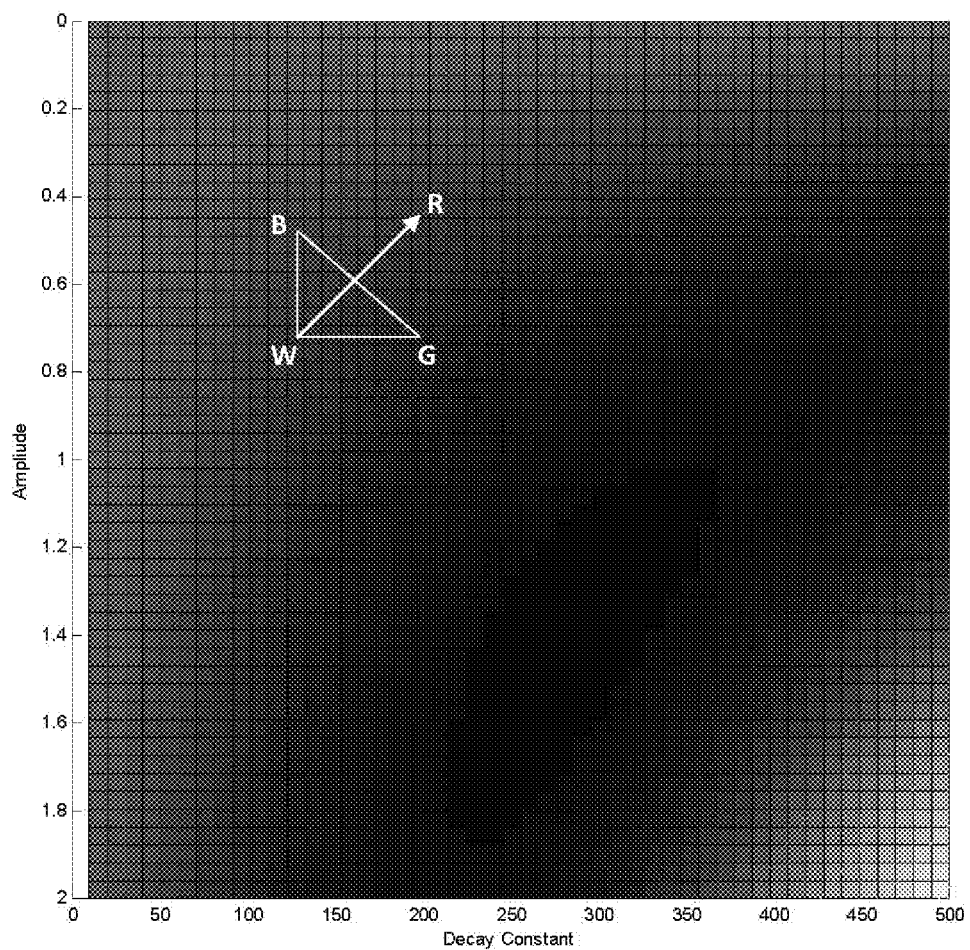
FIG. 3 shows a reflection of the simplex of FIG. 2.

The first step after drawing the initial simplex is to reflect point W about the line BG, as shown in FIG. 3. Once new point R is found, a determination is made as to the relative suitability of this new vertex. If R is neither the worst point nor the best, process starts over with simplex BGR.

Figure 4:
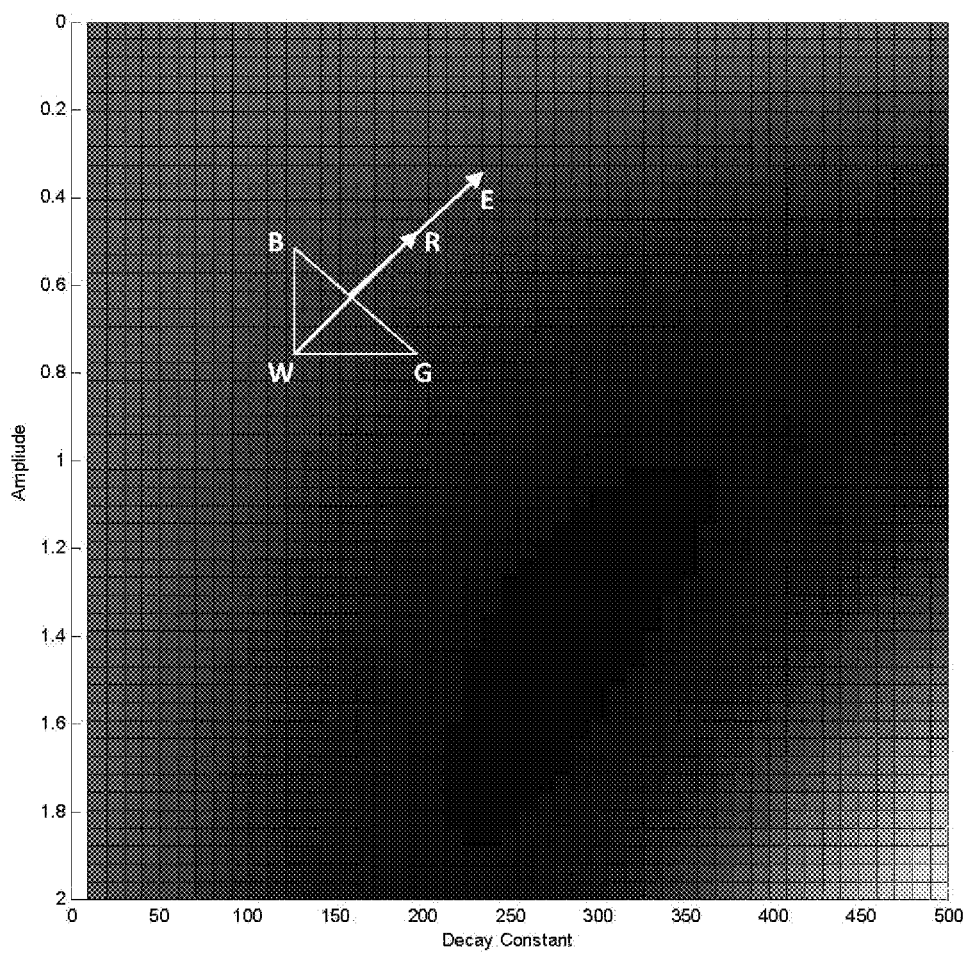
FIG. 4 shows an extension of the simplex of FIG. 2.

However, if R is now the Best, the move was a very good one and the process should continue in that direction. Thus, the process continues along line WR even further to point E, as shown in FIG. 4. This is called extension. The suitability of E is then determined by computing $\chi^2$. If E is better than R, the move was good and the process starts again with the new simplex EBG. If point E is not better than R, the target has been overshot and the process begins again with simplex BGR.

Figure 5:
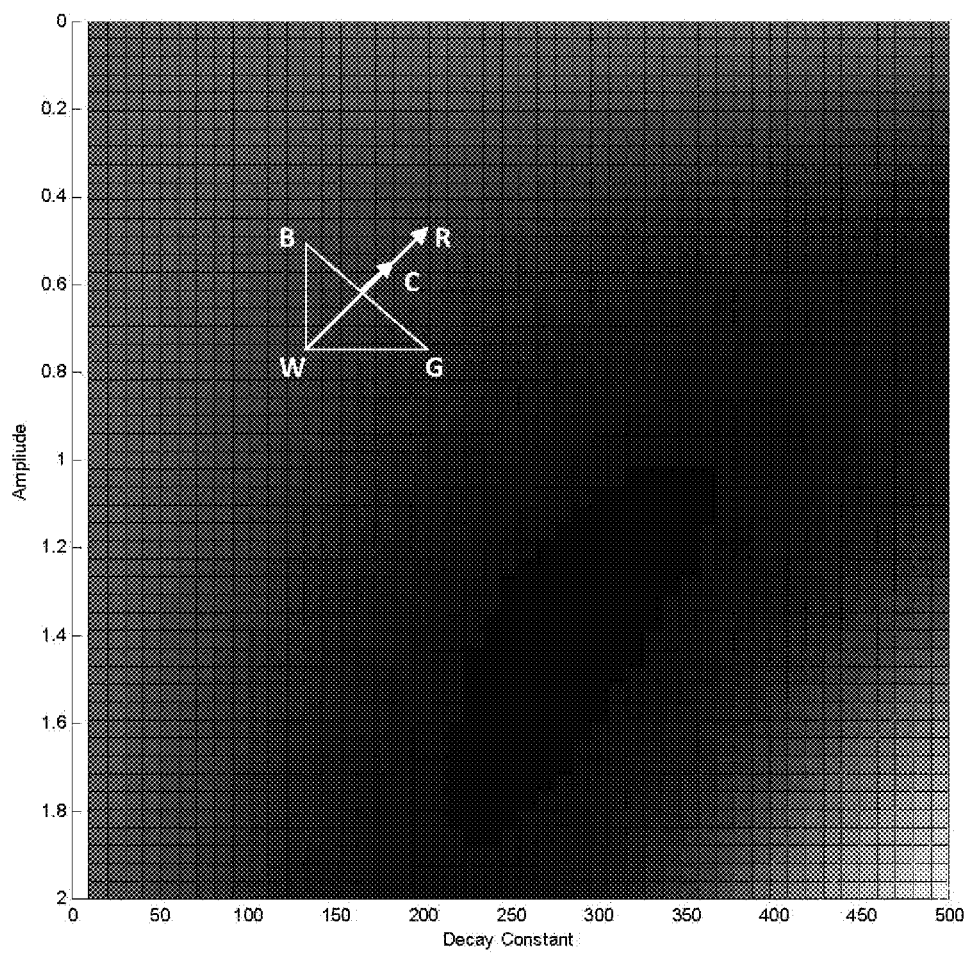
FIG. 5 shows an outer contraction of the simplex of FIG. 2.

If R is determined to be the worst point based on $\chi^2$, then there are two cases to consider. The first is that R is the worst but still better than W. The second is that R is the worst and even worse than W. In the first case, an "outer contraction," as shown in FIG. 5 is performed. Since R is still the worst (but better than W), we know we moved in the right direction, but we may have overshot our target. Thus, the simplex is contracted back towards line BG to point C. Again, point C is tested and if C is better than R, the process begins again with simplex BGC. Otherwise, the simplex BGR is kept and the process begins again.

Figure 6:
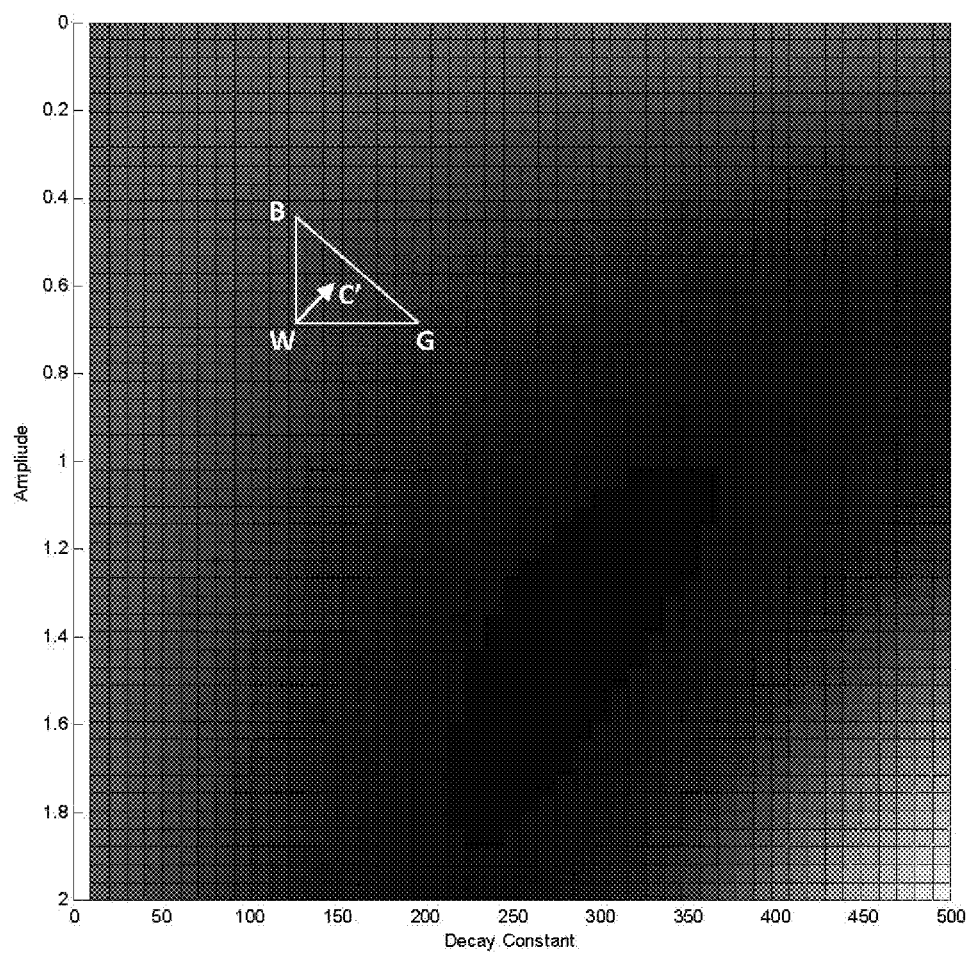
FIG. 6 shows an inner contraction of the simplex of FIG. 2.

In the second case when R is even worse than W, the move from W to R was a very bad one. In this case, an "inner contraction," as shown in FIG. 6 is performed. Since R was even worse than W, reflecting the simplex is not considered. Instead, the simplex is contracted toward line BG to point C'. The assumption is that the move in the direction of points B and G is the correct way to move. Point C' is then checked against W. If C' is better than W, we begin again with the smaller simplex BGC'. Now if C' is not better than W, we must do something completely different since we can't start over with simplex BGW as that was the original simplex.

Figure 7:
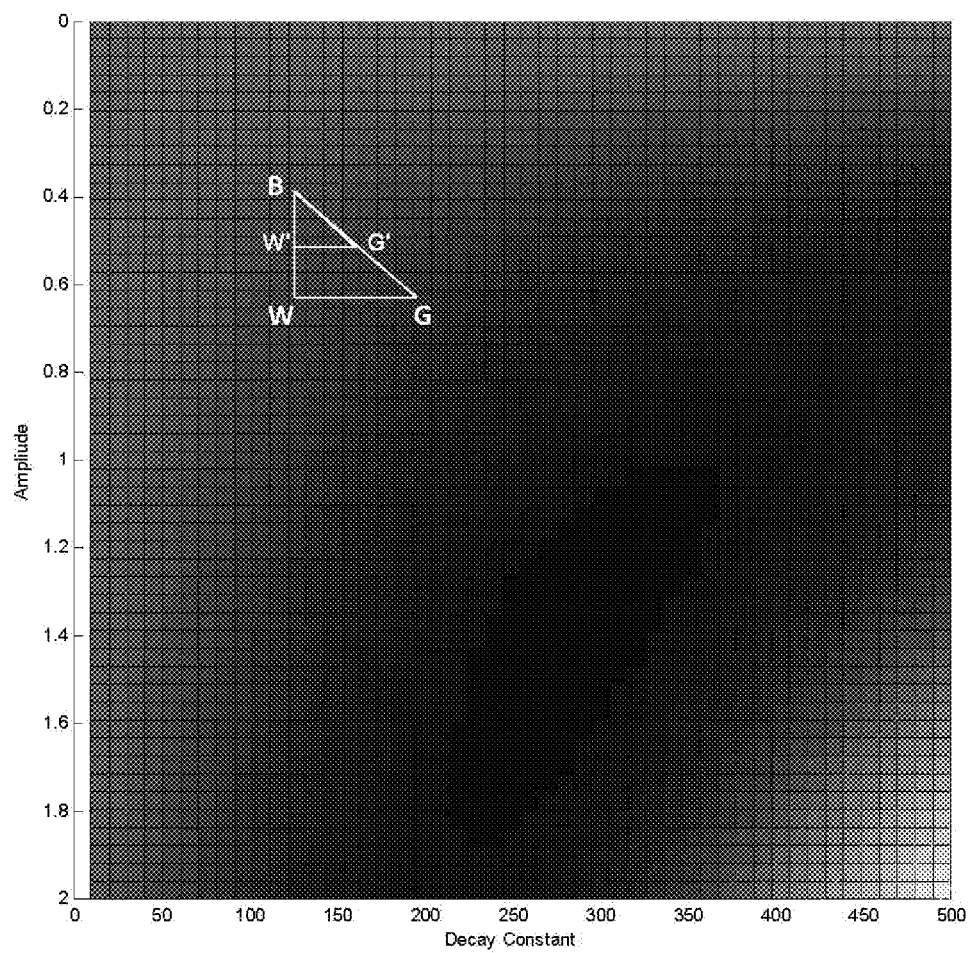
FIG. 7 shows a shrinking operation for the simplex of FIG. 2.

If none of the reflected or contraction points are any better than W, we must conclude that moving in the direction of points B and G is not the proper move. Since we have no other options at this point, the last resort is to "shrink" the simplex toward the best point B, as shown in FIG. 7, and repeat with the smaller simplex BG' W' using the process as shown and described in FIGS. 3-6 above.

Through the shrinking and the contracting steps in the simplex method, the simplex eventually dwindles to a point. Once the simplex has become sufficiently small, the process is ended and the best point is taken as the solution. The only thing not illustrated in this two-dimensional exercise is that when the simplex is reflected, extended or contracted, it is done along the line between W and the midpoint of the remaining points (B, G1, G2 . . . etc.). Although by this example, the midpoint may look to be defined as being between the two best vertices, however, this may not lead to the best fit.

Figure 8:
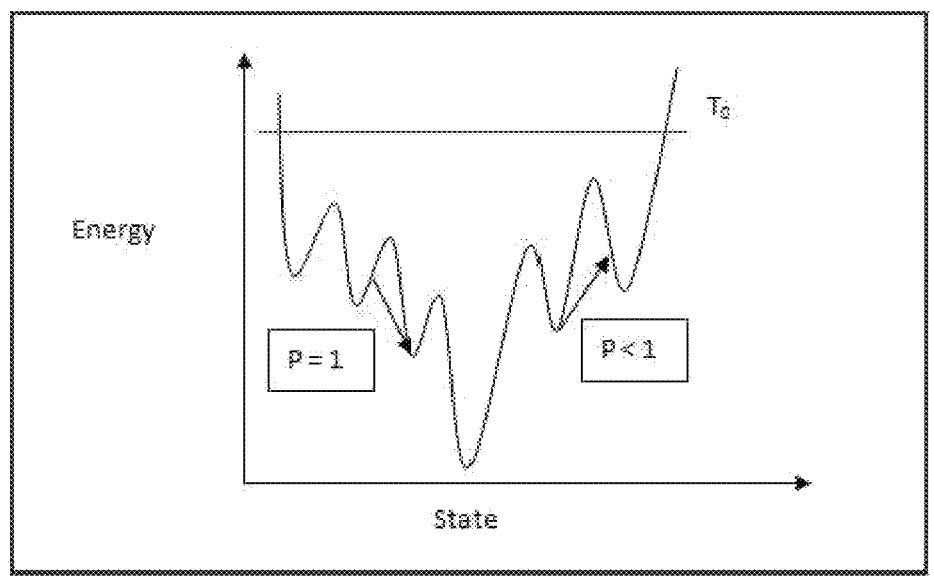
FIG. 8 shows an example representation for simulated annealing in accordance with some aspects of the present disclosure.

In some aspects, a Simulated Annealing method can be used to optimize the dual exponential model to the measured pulsed neutron capture decay curves using the form of equation (1). FIG. 8 shows an example representation for simulated annealing in accordance with some aspects of the present disclosure. The Simulated Annealing method attempts to solve optimization problems by making an analogy to the annealing of solids. The $\chi^2$ is assumed to be analogous to the excitation state of a representative atom or molecule in an imaginary solid. As in a solid, there are various localized minima and an absolute minimum. The local minima represent quantized excitation states, while the absolute minimum represents the ground state. As the temperature is lowered (annealing), fewer and fewer excitation states are available for the molecules and eventually as the temperature is lowered further only the ground state can be occupied.

Simulating annealing is a Monte Carlo optimization derived by analogy to the physics of cooling solids. In the standard simulating annealing problem molecules in a solid at some initial temperature $T_0$ will occupy many different energy states. As the solid is cooled, fewer and fewer energy states will be available for the molecules to occupy. These states will be at lower energies as well. Eventually, the temperature will become so low that only one state, the ground state, remains available. This is the lowest energy state possible for this particular solid.

In the analogous optimization problem our "energy" is the $\chi^2$. Our "states" are the potential solutions for the least squares problem. We allow the solutions to vary within the solution space in the same way molecules would vary energy in a solid. Then we slowly lower the "temperature" limiting the number of allowable states until only the absolute minimum remains. We must be careful not to lower the temperature too quickly or else the solution will get stuck in a local minimum, the equivalent of a metastable state.

To approximate a molecule randomly changing energy levels via thermal motion, we can move our solution coordinates randomly in the solution space. One of the coordinates is randomly resampled within the solution space at each step to arrive at a new point. An acceptance test is then applied based on the $\chi_2$ of this new point. The criterion for acceptance depends on the current temperature but generally if the $\chi_2$ is low (a good point), the probability of acceptance is high and if $\chi_2$ is high (a bad point), the probability is low. The criterion becomes stricter as the temperature is lowered, making it less likely that a "bad" move will be accepted.

For example, the process is begun with an initial guess that establishes the midpoint of the solution space. From there the $\chi^2$ is computed and saved as the initial $\chi^2$. Next, one of the solution variables is randomly sampled from within the solution space and a new $\chi^2$ computed. The probability of accepting this new point is given by the following equation:

$$P(x) = \min\left\{1, e^{-\left(\frac{\chi_2^2 - \chi_1^2}{T}\right)}\right\} \tag{8}$$

where P is the probability between 0 and 1, T is the temperature and $\chi^2_2$ and $\chi^2_1$ are the new and old $\chi^2$s, respectively. If the new $\chi^2$ is better (less than) and old $\chi^2$ then it will always be accepted. If it the new $\chi^2$ is not better it may be accept but the probability depends in how worse it is and the current temperature. As the temperature decreases it becomes less and less likely that a bad move will be accepted. The temperature, T, is lowered each time a new solution is tested. The temperature follows an exponential decay like the following:

$$T = T_0 e^{-\lambda j} \tag{9}$$

with $T_0$ the initial temperature, T the current temperature, $\lambda$ the decay constant and j the iteration number.

The method by which the 4 parameters $\{A_{bh}, \tau_{bh}, A_{fm}, \tau_{fm}\}$ are estimated prior to either the simplex or simulating annealing optimization routines is now discussed. These estimates are the "initial guess" for any optimization routine used. In general, the simplex method requires an educated initial guess for the solution space to converge to the absolute minimum while the simulating annealing does not require a very accurate guess since a random guess will still lead to convergence. However, the better the guess for the simulating annealing, the faster convergence can be achieved.

Figure 9:
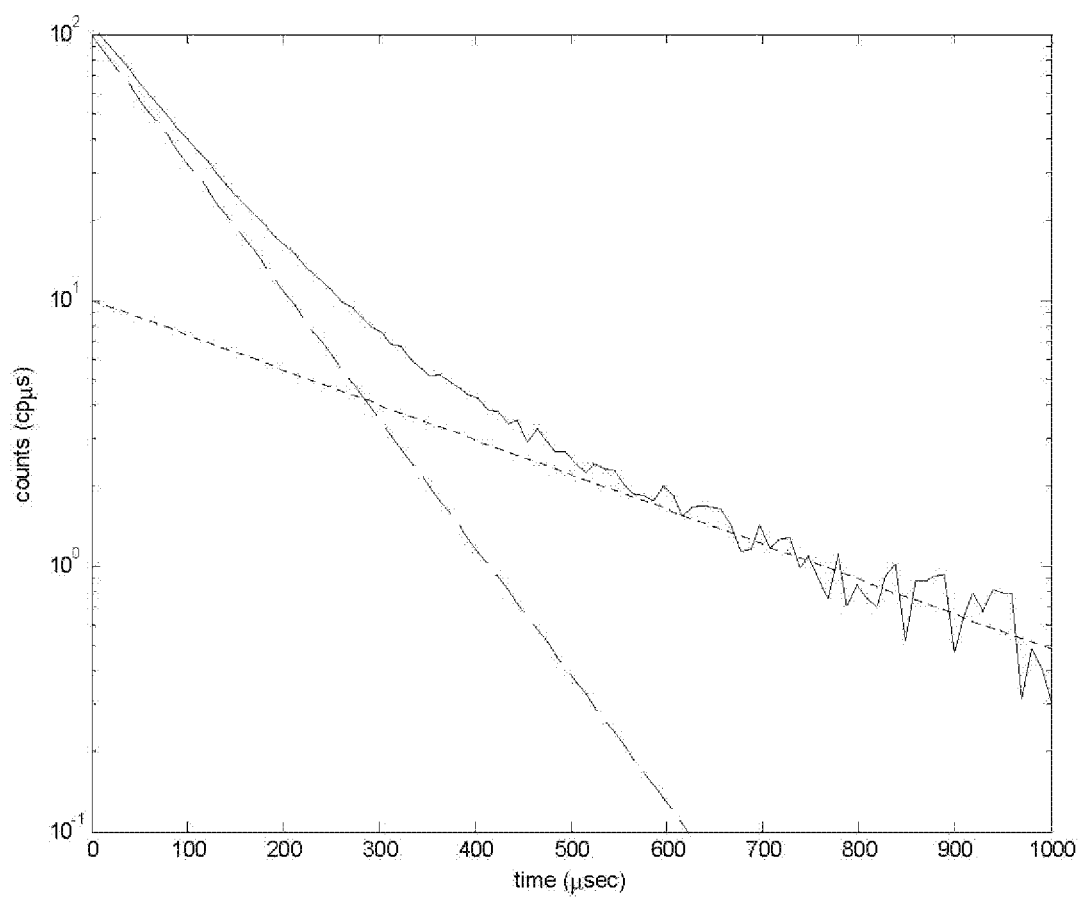
FIG. 9 shows an example decay curve having contributions from two exponentials in accordance with some aspects of the present disclosure.

To compute the initial guess for each method, we make use of some convenient facets of the decay curves. We select two points from the decay data and measure the slope between them, as shown in FIG. 9. Normally, this would not work because there are two exponentials and the measured data is the convolution of the two slopes. However, since one exponential term decays faster than the other, at later times only one exponential remains. By selecting the two points from the data in the later time-range and making the assumption that the faster decaying exponential is negligible we can estimate the amplitude and rate of decay for the slower decaying component.

The initial estimates are determined by selecting four points, two shortly after the pulse and two much later after the pulse. The following equations give the estimates:

$$\tau_{fm} = \frac{t_2 - t_1}{\log\left(\frac{C_1}{C_2}\right)} \tag{10}$$

$$A_{fm} = C_1 e^{\frac{t_1}{\tau_{fm}}} \tag{11}$$

$$\tau_{bh} = \frac{t_4 - t_3}{\log\left(\frac{C_3 - A_{fm} e^{-\frac{t_3}{\tau_{fm}}}}{C_4 - A_{fm} e^{-\frac{t_4}{\tau_{fm}}}}\right)} \tag{12}$$

$$A_{bh} = \left(C_3 - A_{fm} e^{-\frac{t_3}{\tau_{fm}}}\right) e^{-\frac{t_3}{\tau_{bh}}} \tag{13}$$

where $C_1$ to $C_4$ and $t_1$ to $t_4$ are neutron decay counts and neutron decay times, respectively, that corresponds to four points chosen on a neutron decay curve from data from the selected spectra, $A_{bh}$ is an amplitude associated with the borehole, $A_{fm}$ is an amplitude associated with the rock formation surrounding the borehole, $\tau_{bh}$ is a rate of neutron decay associated with the borehole, and $\tau_{fm}$ is a rate of neutron decay associated with the rock formation.

Figure 10:
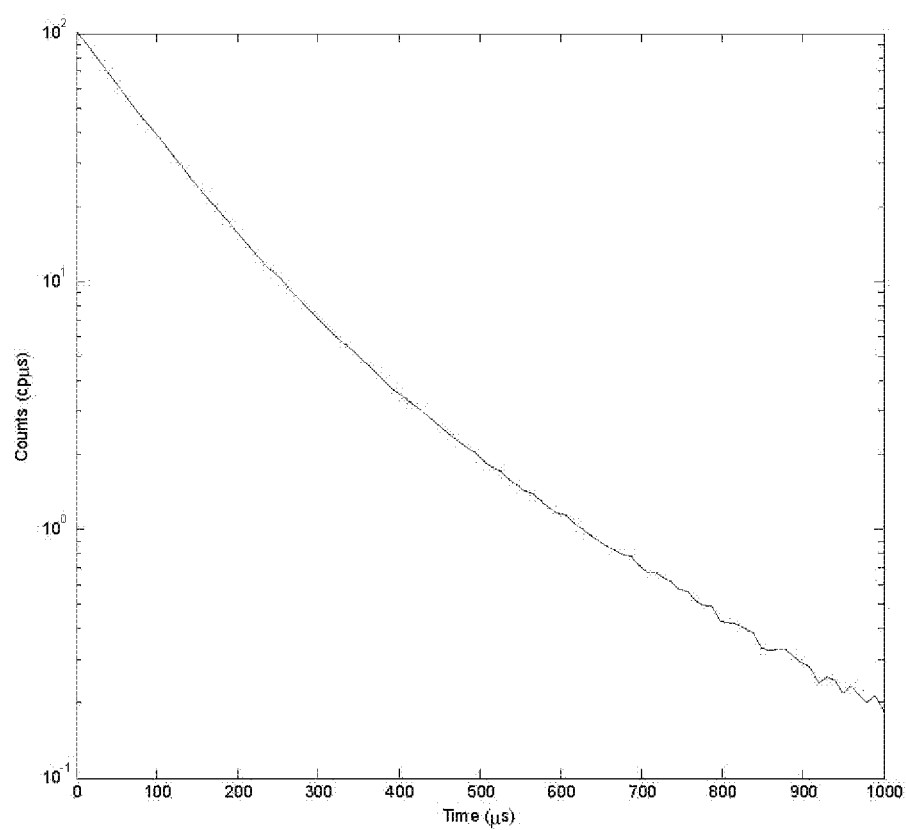
FIG. 10 shows another example decay curve in accordance with some aspects of the present disclosure.

The performance of each method with different initial estimates will now be presented. To test the three methods, we will use a simulated decay curve according to Equation (8) and as shown in FIG. 10:

$$C(t) = 90 e^{-\frac{t}{91}} + 14 e^{-\frac{t}{230}} + 0.25(\gamma - 0.5) \tag{14}$$

where $\gamma$ is a random number chosen between 0 and 1 to simulate noise.

First we will test each method using an arbitrary initial estimate $$A_{bh} = \tau_{bh} = A_{fm} \tau_{fm} 1 \tag{15}$$

Figure 11:
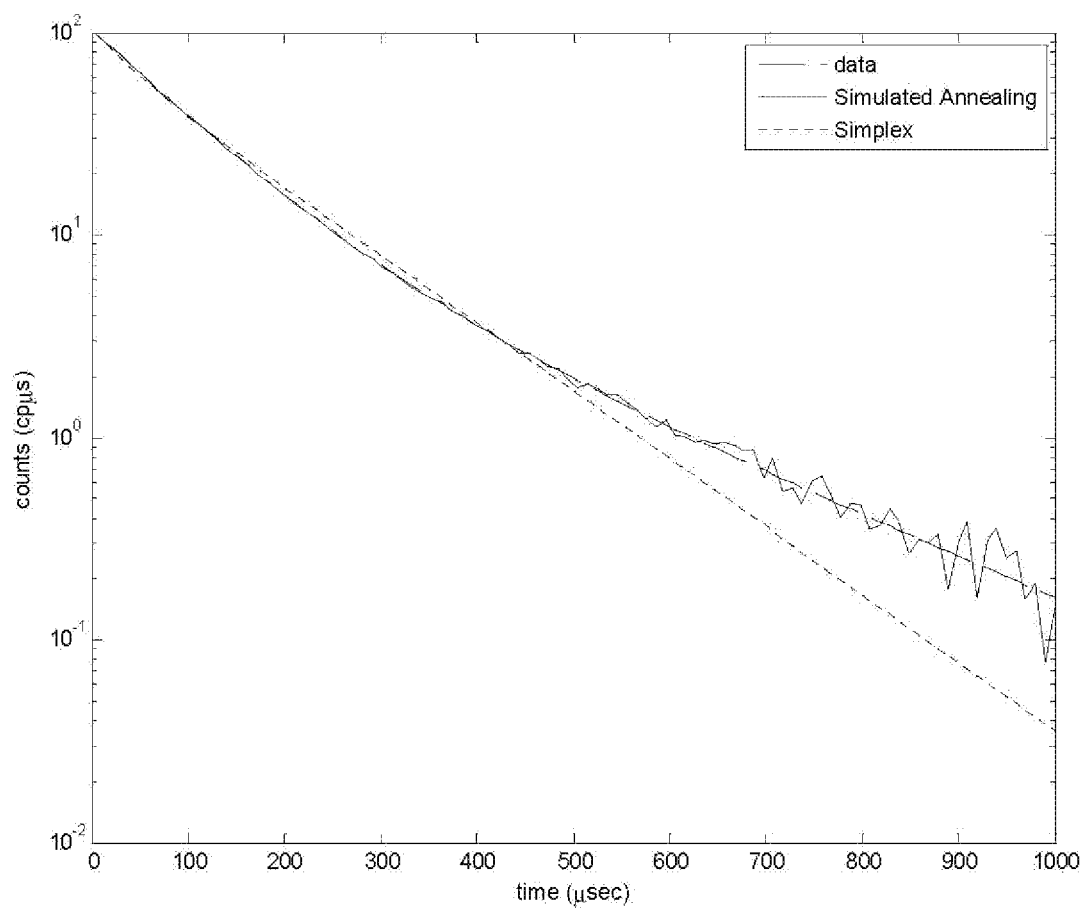
FIG. 11 shows results for case 1 in accordance with some aspects of the present disclosure.

It is immediately apparent from looking at the results, as shown in Table 1 and FIG. 11, that the simulated annealing is the only method that converges on an acceptable solution. The simplex method appears to have converged to a local minimum. While the prior art Newton-Raphson method has not converged at all.

TABLE 1

Result for case 1

| Method | $\chi^2$ | $\tau_{fm}$ |
|---|---|---|
| Newton-Raphson (prior art) | NaN | NaN |
| Simplex | 9.2154 | 130.8 |
| Simulated Annealing | 0.0281 | 230.2 |

Next we try an educated guess for the initial estimate. The importance of this test is that if the initial estimate computed using the method described in the previous section is erroneous, we can fall back on an educated guess, based on a priori knowledge of the reservoir and completion. In this case we assume the following:

$$A_{bh} = 100; \tau_{bh} = 100; A_{fm} = 10; \tau_{fm} = 300 \tag{16}$$

Figure 12:
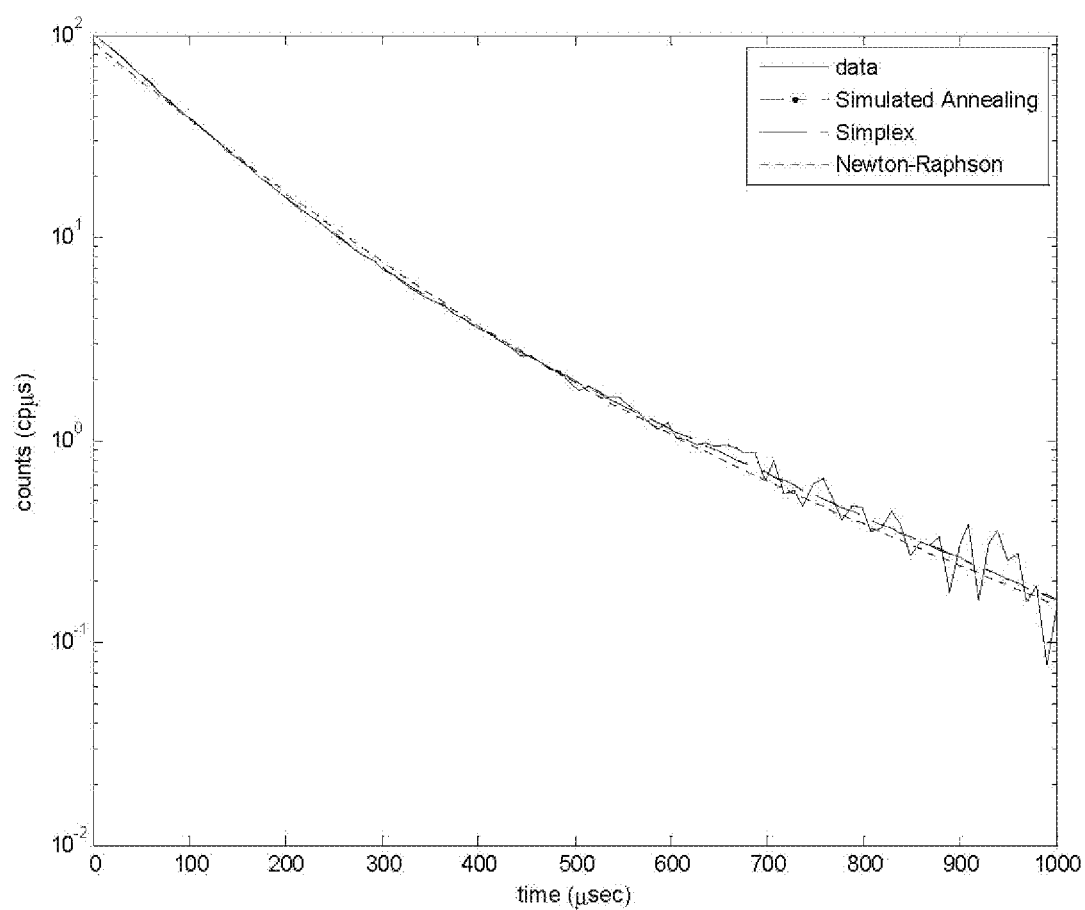
FIG. 12 shows results for case 2 in accordance with some aspects of the present disclosure.

This time each method converges to a solution close to the correct one, as shown in Table 2 and FIG. 12. Both the simplex and simulated annealing methods have significantly lower $\chi^2$ than the prior art Newton-Raphson method. This is caused by the Newton-Raphson method converging to a local minimum close to the absolute minimum. Notice too that the simplex method is slightly lower than the simulated annealing method. Near the absolute minimum there are many local minima caused by the noise in the data. While all of these local minima have about the same $\chi^2$ and are close to each other in the solution space, one has the lowest $\chi^2$. This is the solution the simplex method is converging to.

TABLE 2

Result for case 2

| Method | $\chi^2$ | $\tau_{fm}$ |
| --- | --- | --- |
| Newton-Raphson (prior art) | 0.8128 | 246.5 |
| Simplex | 0.0208 | 227.3 |
| Simulated Annealing | 0.0210 | 226.3 |

Figure 13:
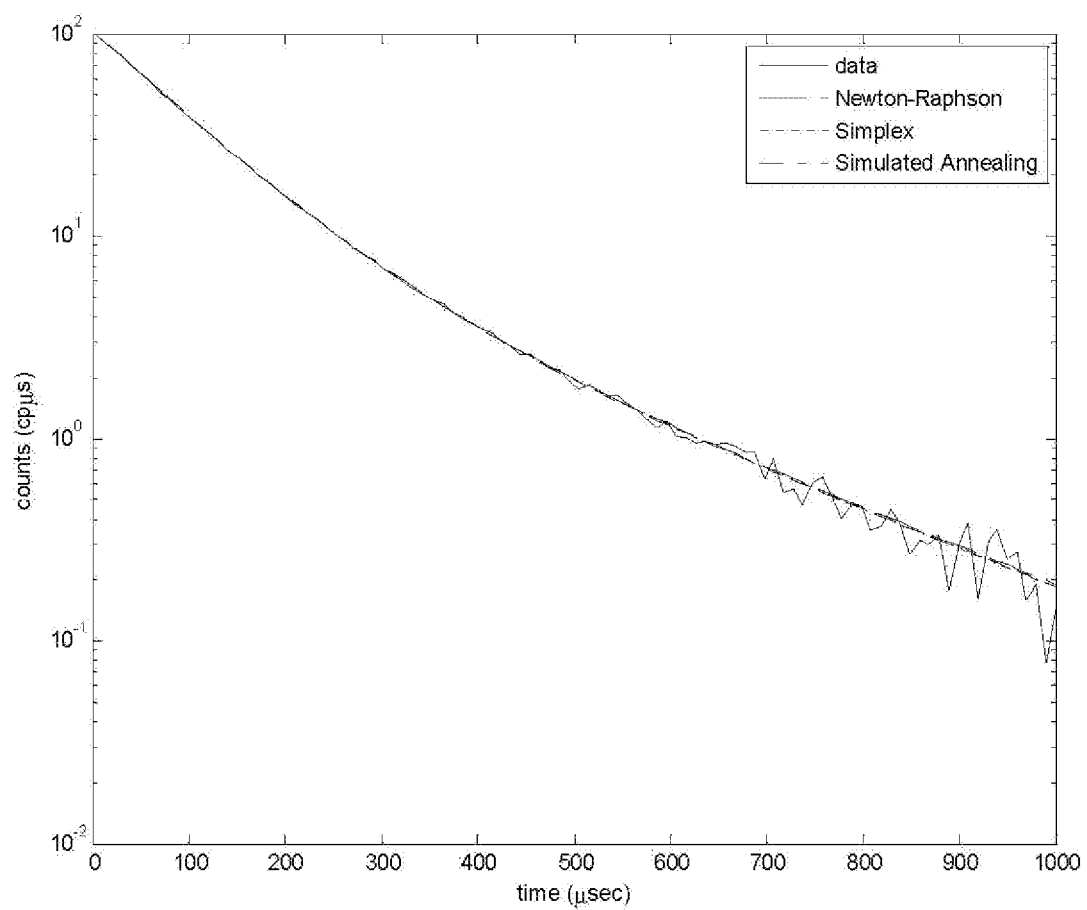
FIG. 13 shows results for case 3 in accordance with some aspects of the present disclosure.

Finally, we look at the results using the initial estimates using equations (8)-(11). Again, the simplex method produces the lowest $\chi^2$ and is the closest $\tau_{fm}$ to the actual value, as shown in Table 3 and FIG. 13. The Newton-Raphson method produces a reasonable result but is still not nearly as accurate as the other two methods.

TABLE 3

Result for case 3

| Method | $\chi^2$ | $\tau_{fm}$ |
| --- | --- | --- |
| Newton-Raphson (prior art) | 0.0772 | 247.6 |
| Simplex | 0.0184 | 231.6 |
| Simulated Annealing | 0.0188 | 232.9 |

It is worth noting that visually all three solutions appear accurate, but the numerical results are significantly different. The Newton-Raphson results were off by −7.5% while the simulated annealing was off by 1.25% and the simplex method by <1%. It is clear from these results that small differences in $\chi^2$ are not apparent from a visual inspection of the decay curves, but can lead to appreciable differences in the final numerical results.

Figure 14:
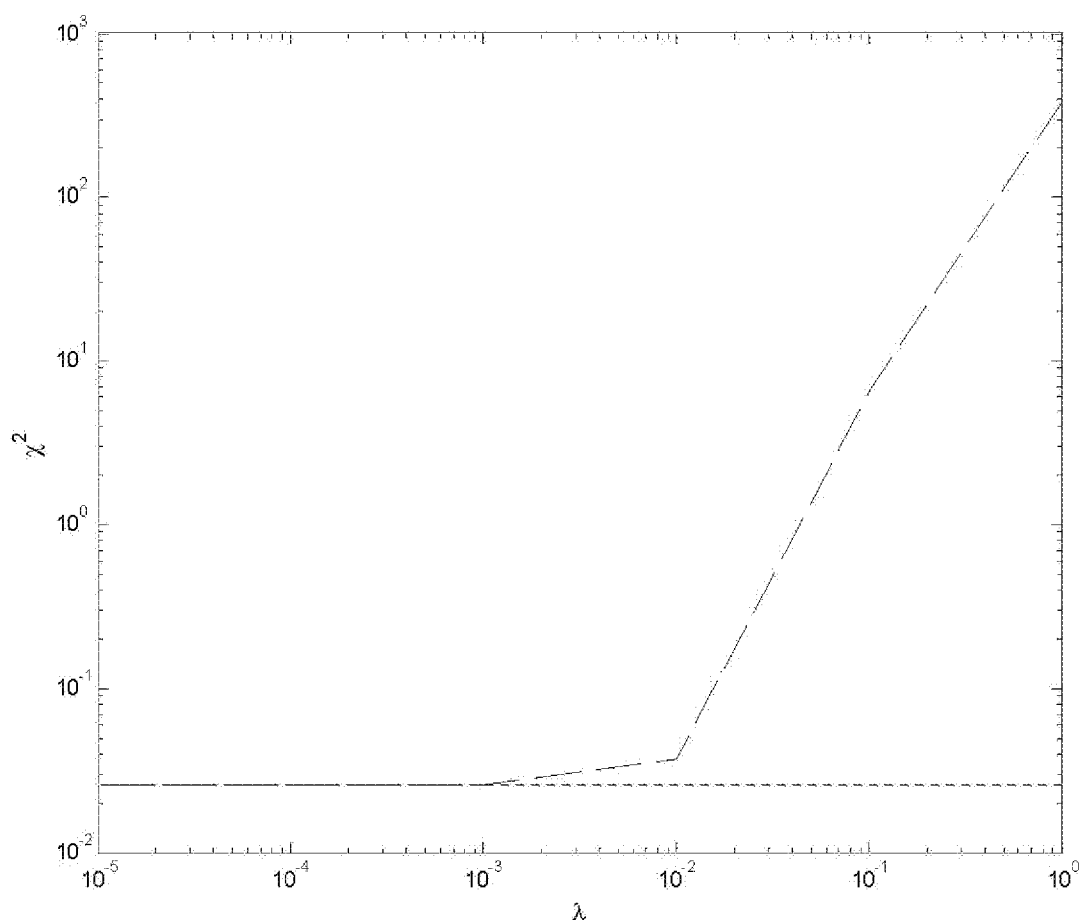
FIG. 14 shows a comparison of annealing time and $\chi^2$ in accordance with some aspects of the present disclosure.

The trade-off with any Monte-Carlo method, like simulated annealing, is increased accuracy and robustness, but at the expense of greatly increased execution time. The execution time in a simulated annealing routine is determined by the rate of annealing. The rate of annealing in our particular implementation is given by Equation (9) above $$T = T_0 e^{-\lambda j} \quad (9)$$

where $T_0$ is the initial temperature, T is the current temperature, $\lambda$ is the decay constant and j is the iteration number, as explained above. By varying $\lambda$ we can slow down or speed up the rate of annealing. The slower the rate of annealing the more accurate the final results will be. Using the example problem discussed in the previous section we can look at how the solution changes with the rate of annealing. We can also see how the computation time increases, as shown in Table 4 and FIG. 14.

TABLE 4

Results for various rates of annealing

| $\lambda$ | $\chi^2$ | $\tau$ | Time (s) |
| --- | --- | --- | --- |
| Simplex | 0.0184 | 231.6 | 0.235 |
| 1 | 4.112 | 550.6 | 0.023 |
| 0.1 | 3.055 | 650.8 | 0.155 |
| 0.01 | 0.0307 | 239.8 | 1.515 |
| 0.001 | 0.0188 | 230.2 | 14.81 |
| 0.0001 | 0.0184 | 231.6 | 148.0 |
| 0.00001 | 0.0184 | 231.5 | 1467 |

Figure 15:
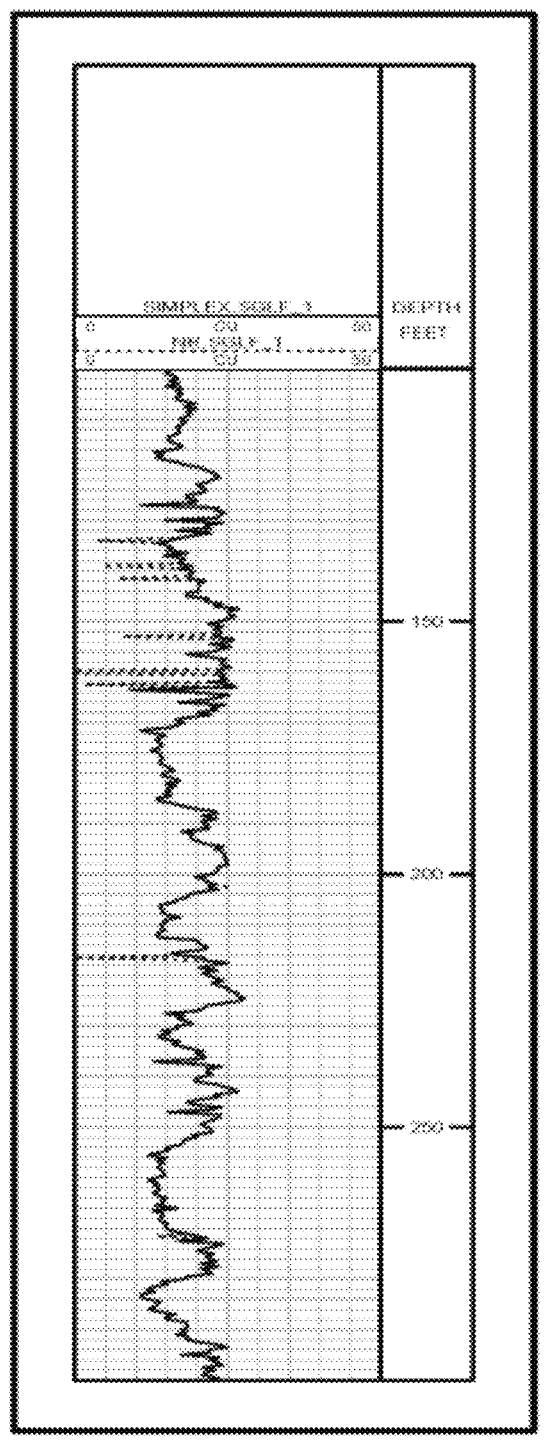
FIG. 15 shows a comparison of a sigma log derived using a Newton-Raphson method (prior art) and a Simplex method in accordance with some aspects of the present disclosure.
Figure 16:
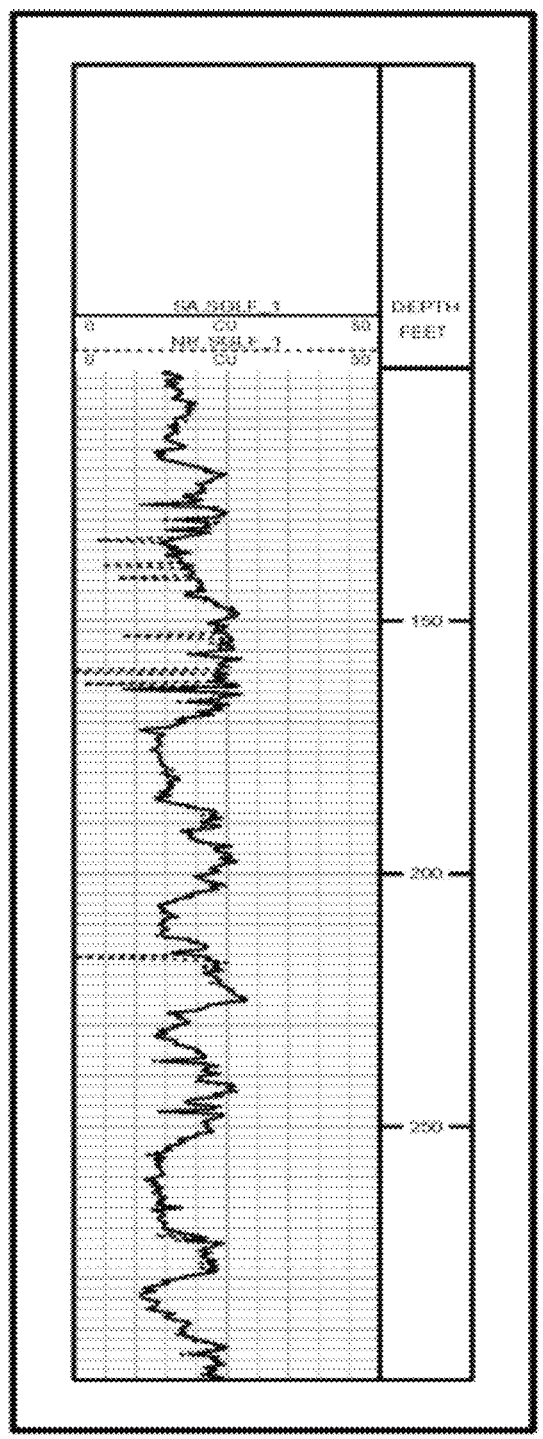
FIG. 16 shows a comparison of a sigma log derived using a Newton-Raphson method (prior art) and a Simulated Annealing method in accordance with some aspects of the present disclosure.

The impact of the increased accuracy can be seen on the logs. When a method converges on to a local minimum, it often shows up on the log as a spike. FIGS. 15 and 16 show a comparison of the three methods. Notice that the Newton-Raphson method produces spikes in the log that are indicative of the method failing to converge while the other two methods produce smooth logs.

Although the invention has been described in detail for the purpose of illustration based on what is currently considered to be a variety of useful embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC including machine executable instructions and programmed to execute the methods, a computer array or network, or other appropriate computing device. The data collected by the detects could undergo some processing and could either stored in memory in the tool, or transmitted up hole for further processing and storage. As a further example, it is to be understood that the present invention contemplates that, to the extent possible, one or more features of any embodiment can be combined with one or more features of any other embodiment.

What is claimed is:

1. A computer-implemented method of obtaining sigma values from pulsed neutron capture decay curve, the method comprising:
   using a pulsed neutron instrument to collect one or more spectra, the pulsed neutron instrument disposed down a borehole traversing a rock formation, the spectra including capture interactions and inelastic interactions;
   selecting one of the spectra collected by the pulsed neutron instrument; and
   modeling, by a processor in communication with a non-transitory, computer-readable medium, the non-transitory, computer-readable medium comprising instructions that when executed cause the processor to select the spectra using a nonlinear model to obtain sigma values relating to one or more reservoir properties, wherein the non-linear model comprises a simulated annealing model.

2. The method of claim 1, wherein the nonlinear model additionally comprises a simplex model.

3. The method of claim 2, wherein the simplex model is a Nelder-Mead simplex model.

4. The method of claim 3, wherein the Nelder-Mead simplex model includes a multiple vertex simplex.

5. The method of claim 1, wherein the sigma values are obtained using a multi-exponential nonlinear model related to the borehole and the rock formation.

6. The method of claim 5, wherein the multi-exponential model is based on parameters that include an amplitude associated with the borehole, an amplitude associated with the rock formation surrounding the borehole, a rate of neutron decay associated with the borehole, and a rate of neutron decay associated with the rock formation.

7. The method of claim 1, wherein the nonlinear model is based on initial estimates related to an amplitude associated with the borehole, an amplitude associated with the rock formation surrounding the borehole, a rate of neutron decay associated with the borehole, and a rate of neutron decay associated with the rock formation.

8. The method of claim 7, wherein the initial estimates are determined according to parameters $C_1$ to $C_4$ and $t_1$ to $t_4$ are neutron decay counts and neutron decay times, respectively, that corresponds to four points chosen on a neutron decay curve from data from the selected spectra, $A_{bh}$ is an amplitude associated with the borehole, $A_{fm}$ is an amplitude associated with the rock formation surrounding the borehole, $\tau_{bh}$ is a rate of neutron decay associated with the borehole, and $\tau_{fm}$ is a rate of neutron decay associated with the rock formation.

9. The method of claim 1, wherein the reservoir properties include petrophysical properties that are selected from the group consisting of: porosity, saturation and gas/water-gas/oil contacts.

10. The method of claim 1, wherein the sigma values are obtained based on a rate of neutron decay in the borehole and the rock formation.

11. The method of claim 1, wherein the reservoir properties include properties related to commercial exploitation of the rock formation, wherein the properties related to commercial exploitation include a pay zone.

12. A computer-implemented system for obtaining sigma values from pulsed neutron capture decay curve, the system comprising:
a pulsed neutron instrument, positionable in a borehole traversing a rock formation, arranged to generate neutrons into the borehole and the rock formation and collect one or more spectra;
a processor in communication with a memory having instructions stored therein which, when executed are arranged to:
select the spectra collected by the pulsed neutron instrument, the spectra comprising capture interactions and inelastic interactions; and
model the selected spectra using a nonlinear model to obtain sigma values relating to one or more reservoir properties, the nonlinear model comprising a simulated annealing model.

13. The system of claim 12, wherein the nonlinear model additionally comprises a simplex model.

14. The system of claim 13, wherein the simplex model is a Nelder-Mead simplex model.

15. The system of claim 14, wherein the Nelder-Mead simplex model includes a multiple vertex simplex.

16. The system of claim 12, wherein the sigma values are obtained using a multi-exponential model related to the borehole and the rock formation.

17. The system of claim 16, wherein the multi-exponential model is based on parameters that include an amplitude associated with the borehole, an amplitude associated with the rock formation surrounding the borehole, a rate of neutron decay associated with the borehole, and a rate of neutron decay associated with the rock formation.

18. The system of claim 13, wherein the nonlinear model is based on initial estimates related to an amplitude associated with the borehole, an amplitude associated with the rock formation surrounding the borehole, a rate of neutron decay associated with the borehole, and a rate of neutron decay associated with the rock formation.

19. The system of claim 18, wherein the initial estimates are determined according to parameters $C_1$ to $C_4$ and $t_1$ to $t_4$ are neutron decay counts and neutron decay times, respectively, that corresponds to four points chosen on a neutron decay curve from data from the selected spectra, $A_{bh}$ is an amplitude associated with the borehole, $A_{fm}$ is an amplitude associated with the rock formation surrounding the borehole, $\tau_{bh}$ is a rate of neutron decay associated with the borehole, and $\tau_{fm}$ is a rate of neutron decay associated with the rock formation.

20. The system of claim 12, wherein the reservoir properties include petrophysical properties that are selected from the group consisting of: porosity, saturation and gas/water-gas/oil contacts.

21. The system of claim 12, wherein the sigma values are obtained based on a rate of neutron decay in the borehole and the rock formation.

22. A system for obtaining sigma values from pulsed neutron capture decay curve comprising:
a pulsed neutron instrument, positionable in a borehole traversing a rock formation, arranged to generate neutrons into the borehole and the rock formation;
a detector, positionable in the borehole, arranged to detect spectra of decaying neutrons, wherein the spectra including capture interactions and inelastic interactions; and
a processor, in communication with a memory having instructions stored therein which, when executed are arranged to model the spectra using a nonlinear model to obtain sigma values relating one or more reservoir properties, wherein the nonlinear model comprises a simulated annealing model.

23. The system in accordance with claim 22, wherein the processor is configured to construct a decay curved and determine an estimate for a decay rate based on the detected spectra.

* * * * *